(12) United States Patent
Kato

(10) Patent No.: US 11,610,349 B2
(45) Date of Patent: *Mar. 21, 2023

(54) FILLING EMPTY PIXELS

(71) Applicant: DREAMWORKS ANIMATION LLC, Glendale, CA (US)

(72) Inventor: Toshiaki Kato, Irvine, CA (US)

(73) Assignee: DREAMWORKS ANIMATION LLC, Glendale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/188,976

(22) Filed: Mar. 1, 2021

(65) Prior Publication Data

US 2021/0183121 A1 Jun. 17, 2021

Related U.S. Application Data

(63) Continuation of application No. 16/716,460, filed on Dec. 16, 2019, now Pat. No. 10,970,894.

(60) Provisional application No. 62/878,671, filed on Jul. 25, 2019.

(51) Int. Cl.
| | |
|---|---|
| *G06T 11/40* | (2006.01) |
| *G06T 11/00* | (2006.01) |
| *G06T 13/80* | (2011.01) |
| *G09G 3/20* | (2006.01) |
| *G06T 5/00* | (2006.01) |

(52) U.S. Cl.
CPC ............ G06T 11/40 (2013.01); G06T 5/005 (2013.01); G06T 11/001 (2013.01); G06T 13/80 (2013.01); G09G 3/2003 (2013.01)

(58) Field of Classification Search
CPC ....... G06T 11/001; G06T 11/40; G06T 5/005; G06T 13/80; G09G 3/2003
See application file for complete search history.

(56) References Cited

U.S. PATENT DOCUMENTS

| | | | | |
|---|---|---|---|---|
| 2013/0100125 A1* | 4/2013 | Zhang | ................... | G06T 5/005 345/419 |
| 2014/0301468 A1* | 10/2014 | Knee | ..................... | H04N 19/82 375/240.16 |
| 2015/0206286 A1* | 7/2015 | Takahashi | .............. | H04N 1/409 382/275 |

\* cited by examiner

*Primary Examiner* — Daniel F Hajnik

(74) *Attorney, Agent, or Firm* — Lee, Hong, Degerman, Kang & Waimey PC

(57) ABSTRACT

A method for rendering a computer image includes, for each pixel of a plurality of N×M pixels forming a tile, determining a plurality of masks for the pixel, wherein N and M denote integers larger than 1, and wherein each mask identifies a respective subset of the pixels that are equidistant from the pixel and located at a respective distance from the pixel. The method further includes: determining an active mask for the tile, the active mask identifying active pixels of the pixels, each of the active pixels being determined as having color information; based on the active mask, identifying an empty pixel of the pixels, the empty pixel lacking color information; and determining at least a first nearest active pixel that is nearest to the empty pixel. The determining includes comparing the active mask with at least one mask of the masks for the empty pixel.

21 Claims, 10 Drawing Sheets

FILLING EMPTY PIXELS

CROSS-REFERENCE TO RELATED APPLICATION(S)

This application is a continuation of U.S. patent application Ser. No. 16/716,460, filed on Dec. 16, 2019, which claims the benefit of U.S. Provisional Application No. 62/878,671, filed Jul. 25, 2019, the contents of which are incorporated by reference herein in their entirety.

BACKGROUND

A computer-generated animation is typically created by rendering a sequence of images, with each image depicting a computer-generated scene composed of one or more computer-generated assets (e.g., a character, a group of characters, an environment, an effect, or a lighting rig). During an interactive session for rendering a scene, an artist may use one or more tools to change aspects or conditions of the scene. For example, a lighting artist may use a lighting tool to change conditions of the scene. According to the changes initiated by the artist, each of one or more rendering engines may render an image depicting the scene and send intermediate snapshots of the rendering results to a front-end client. These intermediate snapshots may be sent at particular time intervals. The front-end client displays the snapshots, e.g., at a monitor. The artist may then evaluate progressive results of the changes that he or she had initiated, as the scene is rendered.

During an interactive rendering session, the artist may evaluate snapshots of an image that is not yet complete. For example, such an image may be in the process of being rendered by the rendering engine(s). In a particular snapshot of the image, aspects of some pixels may have been computed, while aspects of other pixels may not yet have been computed. An example of such an aspect is color information. Accordingly, some pixels located in a tile (a particular region of the image) may have color information that has been computed (or defined), while other pixels located in the tile may not yet have such color information. The former pixels may be referred to as active pixels, and the latter pixels may be referred to as empty pixels.

SUMMARY

With respect to various embodiments disclosed herein, features and techniques are described for rendering images, including intermediate snapshots of images that are in the process of being rendered. For example, snapshots are produced such that all (or most) pixels in tiles forming the images are displayed to appear as active pixels (e.g., pixels defined as having color information). From the perspective of a human observer, rendering images based on such features and techniques produces images/snapshots that may be more visually and/or aesthetically appealing than images/snapshots formed by tiles that have a relatively large number of empty pixels (e.g., pixels for which color information is not defined). According to embodiments disclosed herein, the computational efficiency with which snapshots/images are produced is increased, in order to further improve the quality of a user's experience.

A method for rendering a computer image includes, for each pixel of a plurality of N×M pixels forming a tile of the computer image, determining a plurality of masks for the pixel, wherein N denotes an integer larger than 1, wherein M denotes an integer larger than 1, and wherein each of the plurality of masks identifies a respective subset of the plurality of N×M pixels that are equidistant from the pixel and located at a respective distance from the pixel. The method further includes: determining an active mask for the tile, the active mask identifying active pixels of the plurality of N×M pixels, each of the active pixels being determined as having color information; based on the active mask, identifying an empty pixel of the plurality of N×M pixels, the empty pixel lacking color information; and determining at least a first nearest active pixel of the active pixels that is nearest to the identified empty pixel. The determining includes comparing the active mask with at least one mask of the plurality of masks for the identified empty pixel.

According to at least one embodiment, a machine-readable non-transitory medium storing machine-executable instructions for rendering a computer image is disclosed. The instructions include: for each pixel of a plurality of N×M pixels forming a tile of the computer image, determining a plurality of masks for the pixel, wherein N denotes an integer larger than 1, wherein M denotes an integer larger than 1, and wherein each of the plurality of masks identifies a respective subset of the plurality of N×M pixels that are equidistant from the pixel and located at a respective distance from the pixel. The instructions further include: determining an active mask for the tile, the active mask identifying active pixels of the plurality of N×M pixels, each of the active pixels being determined as having color information; based on the active mask, identifying an empty pixel of the plurality of N×M pixels, the empty pixel lacking color information; and determining at least a first nearest active pixel of the active pixels that is nearest to the identified empty pixel. The determining includes comparing the active mask with at least one mask of the plurality of masks for the identified empty pixel.

According to at least one embodiment, a system for rendering a computer image includes one or more controllers configured to: for each pixel of a plurality of N×M pixels forming a tile of the computer image, determine a plurality of masks for the pixel, wherein N denotes an integer larger than 1, wherein M denotes an integer larger than 1, and wherein each of the plurality of masks identifies a respective subset of the plurality of N×M pixels that are equidistant from the pixel and located at a respective distance from the pixel. The one or more controllers are further configured to: determine an active mask for the tile, the active mask identifying active pixels of the plurality of N×M pixels, each of the active pixels being determined as having color information; based on the active mask, identify an empty pixel of the plurality of N×M pixels, the empty pixel lacking color information; and determine at least a first nearest active pixel of the active pixels that is nearest to the identified empty pixel. The one or more controllers are further configured to determine the first nearest active pixel by comparing the active mask with at least one mask of the plurality of masks for the identified empty pixel.

BRIEF DESCRIPTION OF THE DRAWINGS

The above and other aspects and features of the present disclosure will become more apparent upon consideration of the following description of embodiments, taken in conjunction with the accompanying figures.

DETAILED DESCRIPTION

In the following detailed description, reference is made to the accompanying figures which form a part hereof, and which show by way of illustration specific embodiments of the present invention. It is to be understood by those of ordinary skill in the technological field of computer animation and other computer modeling applications that other embodiments may be utilized, and that structural, electrical, as well as procedural changes may be made without departing from the scope of the present invention. Wherever possible, the same reference numbers will be used throughout the drawings to refer to the same or similar parts.

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the present technology. Thus, the disclosed technology is not intended to be limited to the examples described herein and shown but is to be accorded the scope consistent with the claims.

For descriptive purposes, throughout this disclosure, software, software modules, software objects, and the like may be described as performing various functions. One of ordinary skill in the art, however, will recognize that software may not actively perform any function and instead may include instructions that are executable on a computer processor. As such, although software may be described herein as performing a function, it should be appreciated that a computer processor or other computing device may typically perform those functions attributed herein to software modules or objects by executing computer instructions provided by the software modules or objects.

Figure 1:
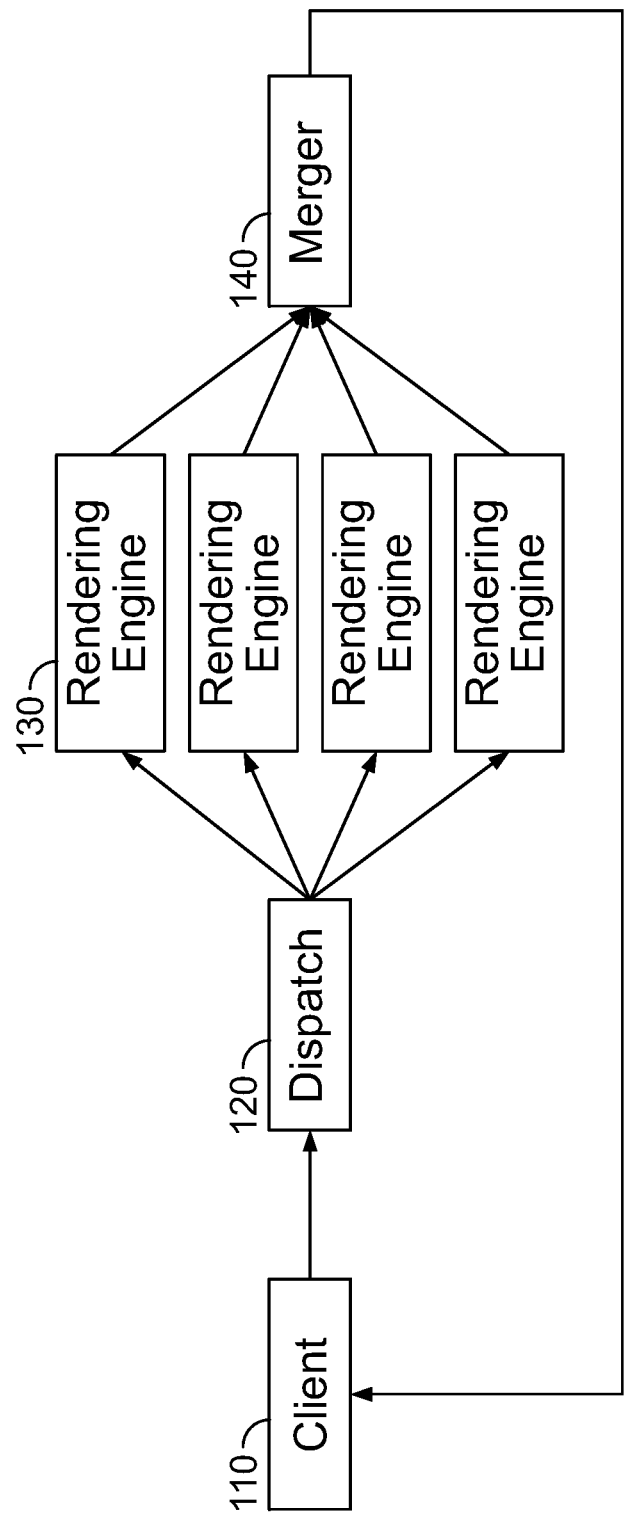
FIG. 1 is a block diagram illustrating operation by a plurality of rendering processes according to least one embodiment.

With reference to FIG. 1, during an interactive rendering session, a client (e.g., front-end client 110) provides inputs (or input images) to a dispatch 120. The inputs may include, e.g., changes initiated by an artist. For example, the changes may be provided during the session, which may be an interactive lighting session. The dispatch 120 provides the inputs to each of a plurality of rendering engines 130. The rendering engines 130 may reside on one or more hosts that are separate from the front-end client 110. For example, the rendering engines 130 may all reside on different hosts. The inputs are collectively processed by the rendering engines 130.

Each of the rendering engines 130 generates results. For example, different rendering engines 130 may provide results for different pixels. At a given time, results generated by the rendering engines 130 are merged (e.g., by a merger 140) to produce a merged result. The merged result is provided to the front-end client 110. The front-end client 110 may control a display, e.g., an external monitor, to display snapshots of the merged result. As such, the artist may evaluate progressive results of the changes that he or she had initiated.

According to various embodiments of the present invention, multi-machine rendering may be used in providing an interactive feedback loop that allows an artist to make changes to a scene and monitor the results. However, it is understood that features described herein can be applied in other rendering contexts, including single-machine rendering.

According to at least one embodiment, the display of an image that is rendered via an interactive loop or process is presented, e.g., over a series of snapshots, as tiles that are updated according to some pattern. Accordingly, the artist may see an image that is collectively built by blocks of tiles, each of which is formed by multiple tiles.

Each tile may correspond to a respective region of pixels having dimensions of M pixels by N pixels (N and M may be the same or different integer). A pattern according to which individual tiles are updated may not be known in advance. Similarly, a pattern according to which individual pixels in a tile are updated may not be known in advance. In this situation, the individual tiles, as well as the individual pixels, may be rendered in a random order.

Figure 2A:
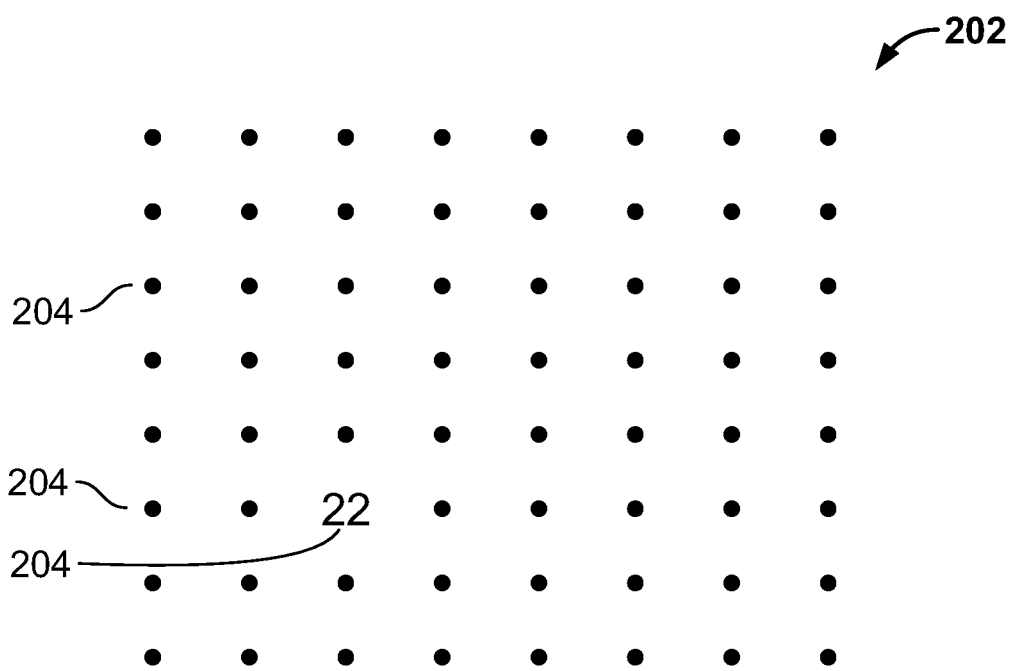
FIGS. 2A, 2B, 2C, 2D, 2E, 2F, 2G, 2H and 2I illustrate examples of pixels referenced by searchMasks that identify pixels that are nearest to a particular pixel, according to at least one embodiment.

For purposes of description, various aspects and features will be described with reference to a tile (or region) that has a height dimension that is equal to its width dimension (e.g., M=N). For example, FIG. 2A illustrates an example of a tile 202 having a width of 8 pixels and a width of 8 pixels. However, it is understood that aspects and features described herein are applicable in situations involving tiles having a height dimension that is different from their width dimension.

With reference to FIG. 2A, the tile 202 has sixty-four pixels 204 in total. One of the pixels 204, a pixel in the (2, 2) position within the tile (i.e., the (2, 2) pixel), is identified in FIG. 2A as '22'. For purposes of description, a pixel in the (x, y) position will be referred to herein as 'the (x, y) pixel' and will be labeled in the drawings as 'yx'.

In addition, pixels will be described as being closest or nearest to a particular pixel, with respect to distance (e.g., Euclidean distance). The distance may refer to the distance between respective centers of particular pixels.

With reference to the example illustrated in FIG. 2A, the pixel 204 that is closest to the (2, 2) pixel is the (2, 2) pixel itself. This is because no other pixels in the tile 202 are closer to the (2, 2) pixel. To identify the (2, 2) pixel as being closest to itself, a bit in a mask ("searchMask0") is set to a particular value (e.g., 1). SearchMask0 is a 64-bit integer, in which each bit uniquely corresponds to a respective pixel of the tile 202. The single bit that is set to the particular value (e.g., 1) uniquely corresponds to the (2, 2) pixel. The 63 other bits (i.e., the 63 remaining bits) in searchMask0 are set to a different value (e.g., 0). By way of example, searchMask0 may have a hexadecimal value of 0x0000000000040000. As such, searchMask0 indicates that the (2, 2) pixel, itself, is closest to the (2, 2) pixel.

Figure 2B:
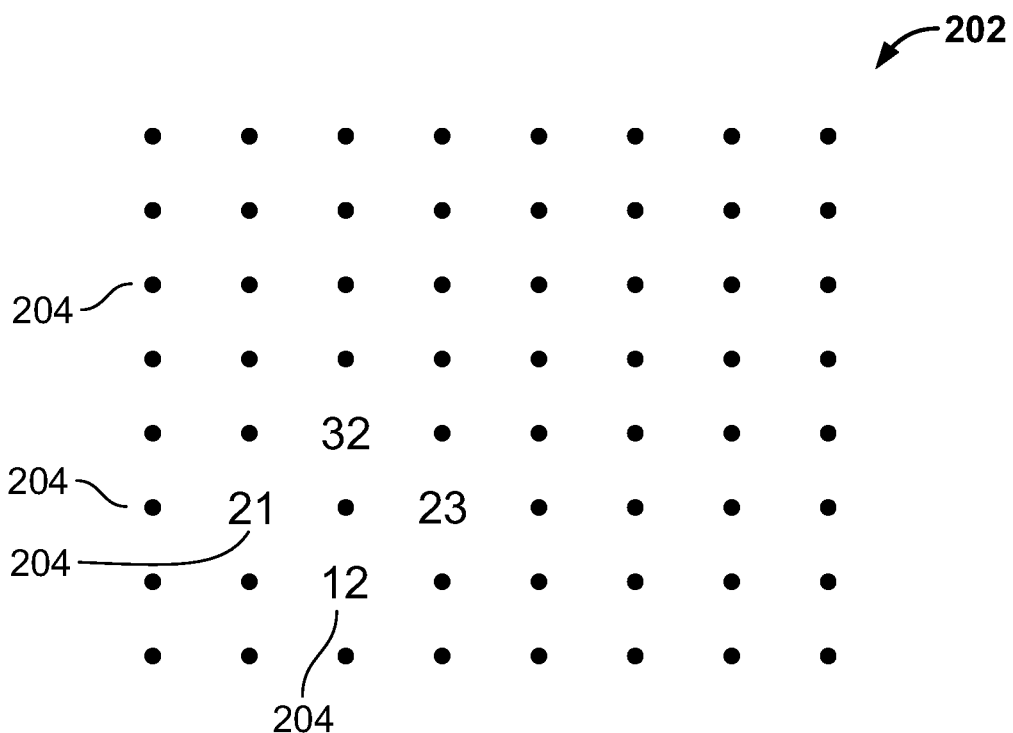

Next, the pixels 204 other than the pixel indicated by searchMask0 are considered. With reference to FIG. 2B, the pixels 204 that are next closest to the (2, 2) pixel are: the (1, 2) pixel, the (2, 3) pixel, the (3, 2) pixel, and the (2, 1) pixel. All four of these pixels are equidistant from the (2, 2) pixel. No other pixels 204 (other than the pixel indicated by searchMask0) are closer to the (2, 2) pixel.

Accordingly, a total of four bits in searchMask1 are set to a particular value (e.g., 1). Each of the four bits uniquely corresponds to a respective one of the four pixels identified in FIG. 2B. The 60 other bits (i.e., the 60 remaining bits) in searchMask1 are set to a different value (e.g., 0). By way of example, searchMask1 may have a hexadecimal value of 0x00000000040a0400. As such, searchMask1 indicates that the four pixels identified in FIG. 2B are second-closest to the (2, 2) pixel.

Figure 2C:
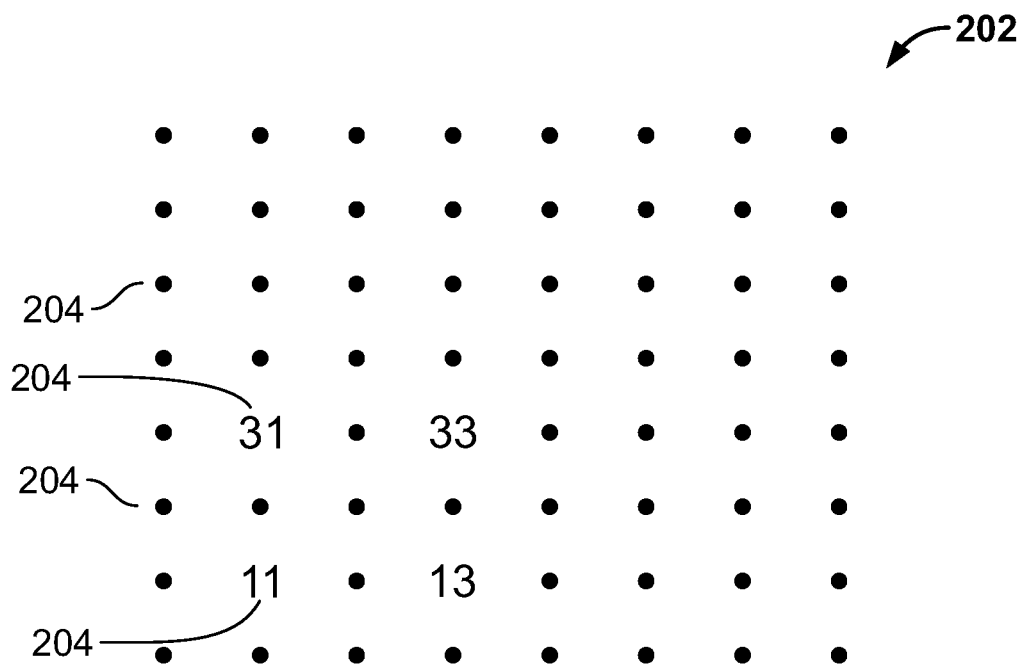

Next, the pixels 204 other than the pixels indicated by searchMask0 or searchMask1 are considered. With reference to FIG. 2C, the pixels that are next closest to the (2, 2) pixel are: the (1, 1) pixel, the (1, 3) pixel, the (3, 3) pixel, and the (3, 1) pixel. All four of these pixels are equidistant from the (2, 2) pixel. No other pixels (other than the pixels indicated by searchMask0 or searchMask1) are closer to the (2, 2) pixel.

Accordingly, a total of four bits in searchMask2 are set to a particular value (e.g., 1). Each of the four bits uniquely corresponds to a respective one of the four pixels identified in FIG. 2C. The 60 other bits (the 60 remaining bits) in searchMask2 are set to a different value (e.g., 0). By way of example, searchMask2 may have a hexadecimal value of 0x000000000a000a00. As such, searchMask2 indicates that the four pixels identified in FIG. 2C are third-closest to the (2, 2) pixel.

Figure 2D:
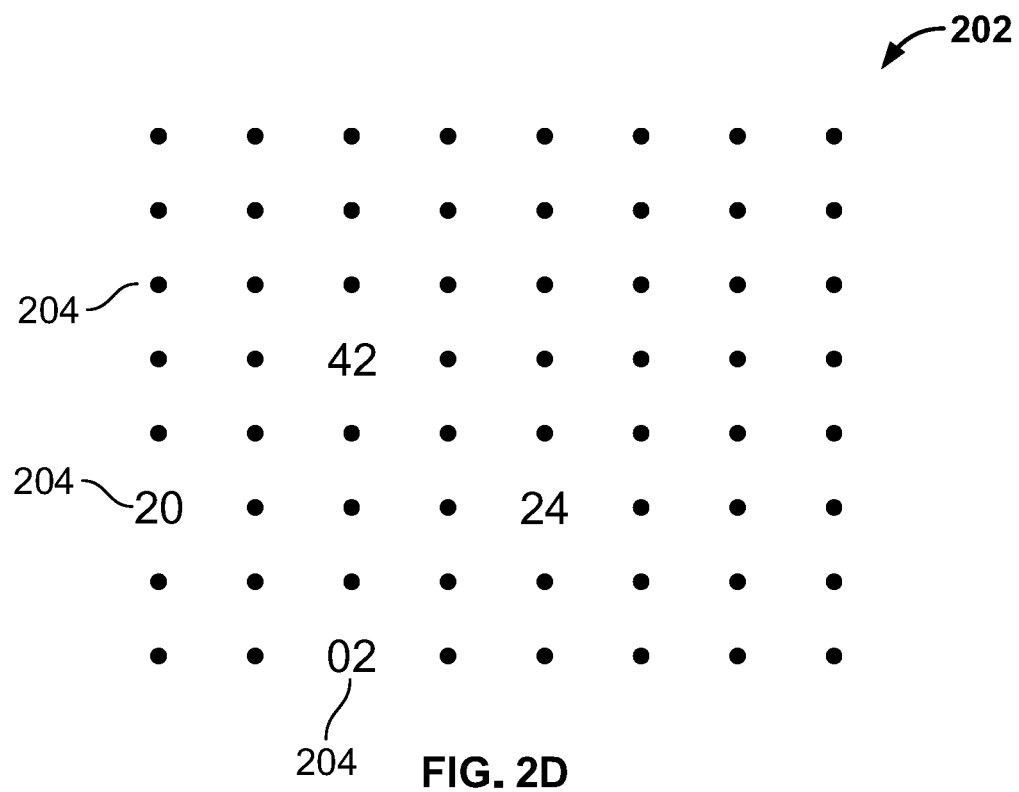

Next, the pixels 204 other than the pixels indicated by searchMask0, searchMask1 or searchMask2 are considered. With reference to FIG. 2D, the pixels that are next closest to the (2, 2) pixel are: the (0, 2) pixel, the (2, 4) pixel, the (4, 2) pixel, and the (2, 0) pixel. All four of these pixels are equidistant from the (2, 2) pixel. No other pixels (other than the pixels indicated by searchMask0, searchMask1 or searchMask2) are closer to the (2, 2) pixel.

Accordingly, a total of four bits in searchMask3 are set to a particular value (e.g., 1). Each of the four bits uniquely corresponds to a respective one of the four pixels identified in FIG. 2D. The 60 other bits (the 60 remaining bits) in searchMask3 are set to a different value (e.g., 0). By way of example, searchMask3 may have a hexadecimal value of 0x0000000400110004. As such, searchMask3 indicates that the four pixels identified in FIG. 2D are fourth-closest to the (2, 2) pixel.

Figure 2E:
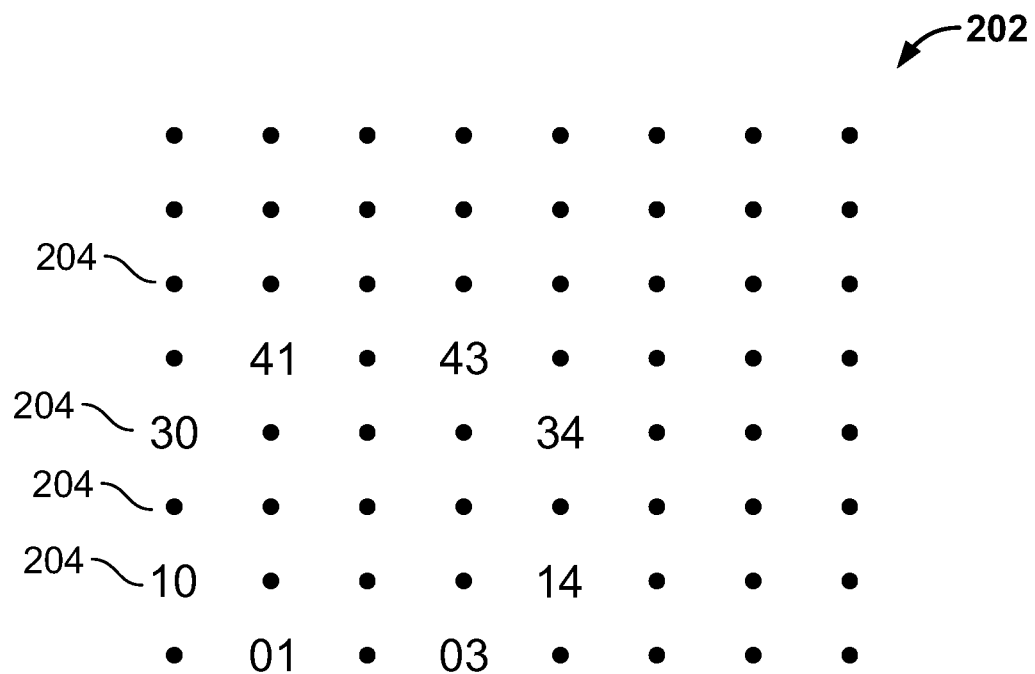

Next, the pixels 204 other than the pixels indicated by searchMask0, searchMask1, searchMask2 or searchMask3 are considered. With reference to FIG. 2E, the pixels that are next closest to the (2, 2) pixel are: the (0, 1) pixel, the (0, 3) pixel, the (1, 4) pixel, the (3, 4) pixel, the (4, 3) pixel, the (4, 1) pixel, the (3, 0) pixel and the (1, 0) pixel. All eight of these pixels are equidistant from the (2, 2) pixel. No other pixels (other than the pixels indicated by searchMask0, searchMask1, searchMask2 or searchMask3) are closer to the (2, 2) pixel.

Accordingly, a total of eight bits in searchMask4 are set to a particular value (e.g., 1). Each of the eight bits uniquely corresponds to a respective one of the eight pixels identified in FIG. 2E. The 56 other bits (the 56 remaining bits) in searchMask4 are set to a different value (e.g., 0). By way of example, searchMask4 may have a hexadecimal value of 0x0000000a1100110a. As such, searchMask4 indicates that the eight pixels identified in FIG. 2E are fifth-closest to the (2, 2) pixel.

Figure 2F:
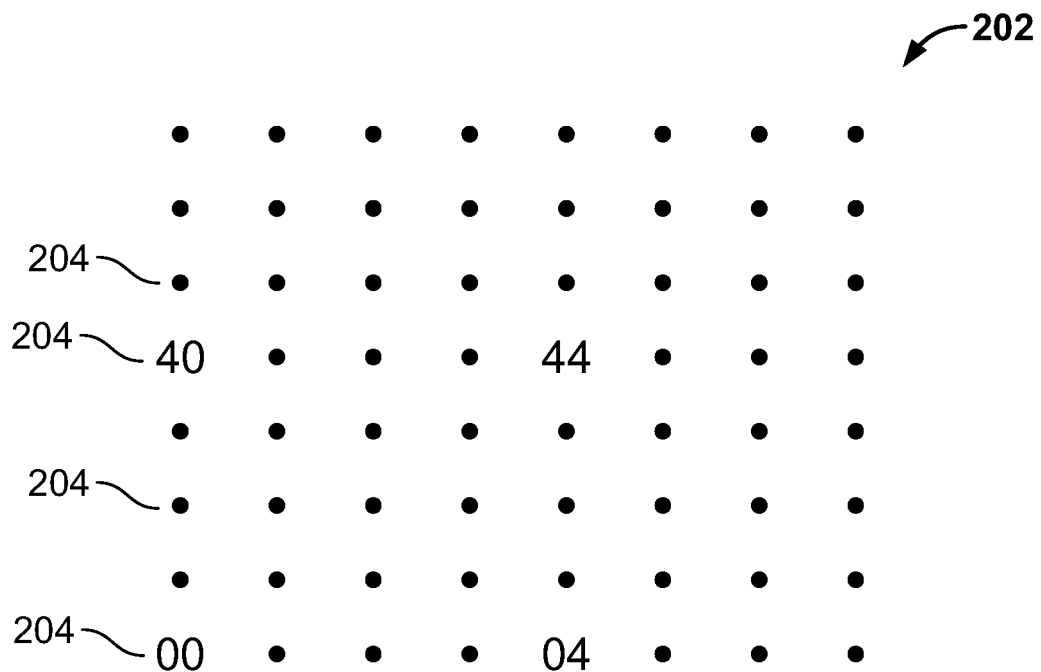

Next, the pixels 204 other than the pixels indicated by searchMask0, searchMask1, searchMask2, searchMask3 or searchMask4 are considered. With reference to FIG. 2F, the pixels that are next closest to the (2, 2) pixel are: the (0, 0) pixel, the (0, 4) pixel, the (4, 4) pixel and the (4, 0) pixel. All four of these pixels are equidistant from the (2, 2) pixel. No other pixels (other than the pixels indicated by searchMask0, searchMask1, searchMask2, searchMask3 or searchMask4) are closer to the (2, 2) pixel.

Accordingly, a total of four bits in searchMask5 are set to a particular value (e.g., 1). Each of the four bits uniquely corresponds to a respective one of the four pixels identified in FIG. 2F. The 60 other bits (the 60 remaining bits) in searchMask5 are set to a different value (e.g., 0). By way of example, searchMask5 may have a hexadecimal value of 0x0000001100000011. As such, searchMask5 indicates that the four pixels identified in FIG. 2F are sixth-closest to the (2, 2) pixel.

Figure 2G:
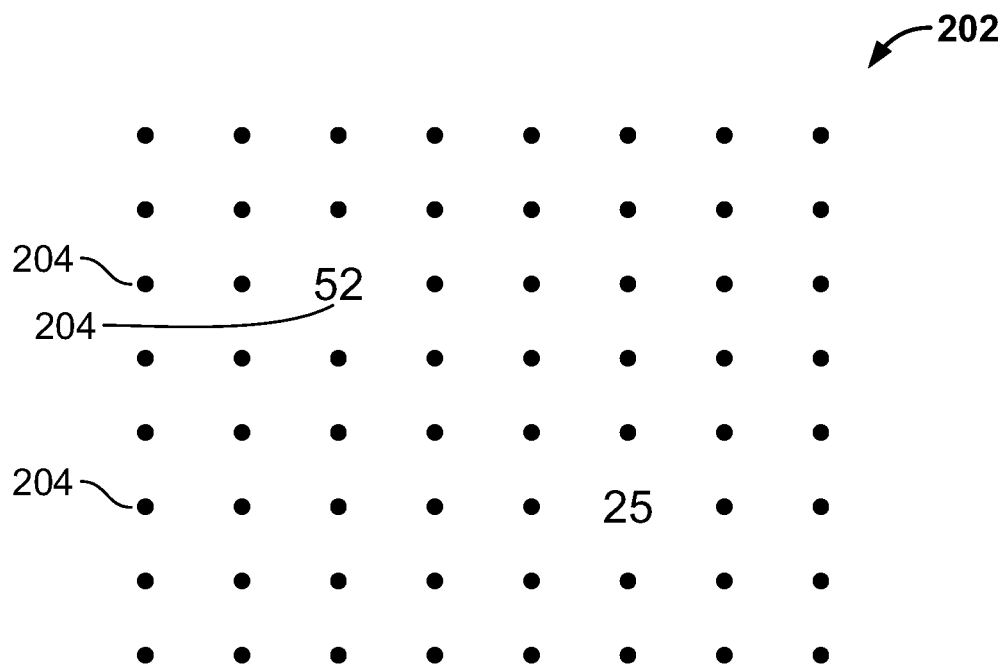

Next, the pixels 204 other than the pixels indicated by searchMask0, searchMask1, searchMask2, searchMask3, searchMask4 or searchMask5 are considered. With reference to FIG. 2G, the pixels that are next closest to the (2, 2) pixel are: the (5, 2) pixel and the (2, 5) pixel. All two of these pixels are equidistant from the (2, 2) pixel. No other pixels (other than the pixels indicated by searchMask0, searchMask1, searchMask2, searchMask3, searchMask4 or searchMask5) are closer to the (2, 2) pixel.

Accordingly, a total of two bits in searchMask6 are set to a particular value (e.g., 1). Each of the two bits uniquely corresponds to a respective one of the two pixels identified in FIG. 2G. The 62 other bits (the 62 remaining bits) in searchMask6 are set to a different value (e.g., 0). By way of example, searchMask6 may have a hexadecimal value of 0x0000040000200000. As such, searchMask6 indicates that the two pixels identified in FIG. 2G are seventh-closest to the (2, 2) pixel.

Figure 2H:
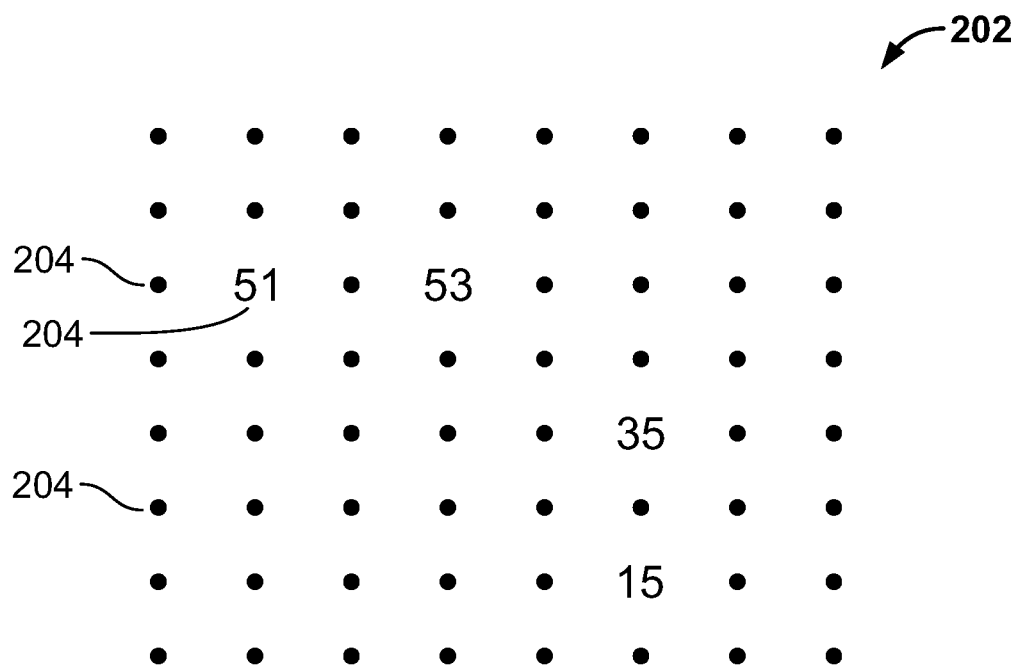

Next, the pixels 204 other than the pixels indicated by searchMask0, searchMask1, searchMask2, searchMask3, searchMask4, searchMask5 or searchMask6 are considered. With reference to FIG. 2H, the pixels that are next closest to the (2, 2) pixel are: the (1, 5) pixel, the (3, 5) pixel, the (5, 3) pixel and the (5, 1) pixel. All four of these pixels are equidistant from the (2, 2) pixel. No other pixels (other than the pixels indicated searchMask0, searchMask1, searchMask2, searchMask3, searchMask4, searchMask5 or searchMask6) are closer to the (2, 2) pixel.

Accordingly, a total of four bits in searchMask7 are set to a particular value (e.g., 1). Each of the four bits uniquely corresponds to a respective one of the four pixels identified in FIG. 2H. The 60 other bits (the 60 remaining bits) in mask7 are set to a different value (e.g., 0). By way of example, searchMask7 may have a hexadecimal value of 0x00000a0020002000. As such, searchMask7 indicates that the four pixels identified in FIG. 2H are eighth-closest to the (2, 2) pixel.

Figure 2I:
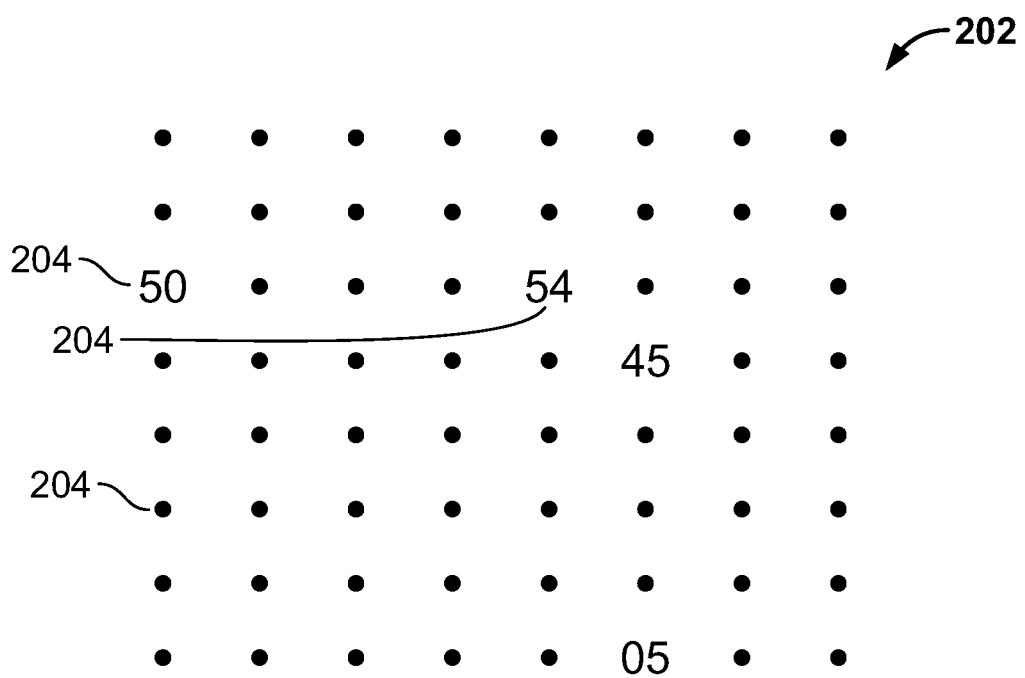

Next, the pixels 204 other than the pixels indicated by searchMask0, searchMask1, searchMask2, searchMask3, searchMask4, searchMask5, searchMask6 or searchMask7 are considered. With reference to FIG. 2I, the pixels that are next closest to the (2, 2) pixel are: the (0, 5) pixel, the (4, 5) pixel, the (5, 4) pixel and the (5, 0) pixel. All four of these pixels are equidistant from the (2, 2) pixel. No other pixels (other than the pixels indicated by searchMask0, searchMask1, searchMask2, searchMask3, searchMask4, searchMask5, searchMask6 or searchMask7) are closer to the (2, 2) pixel.

Accordingly, a total of four bits in searchMask8 are set to a particular value (e.g., 1). Each of the four bits uniquely corresponds to a respective one of the four pixels identified in FIG. 2I. The 60 other bits (the 60 remaining bits) in searchMask8 are set to a different value (e.g., 0). By way of example, searchMask8 may have a hexadecimal value of 0x0000112000000020. As such, searchMask8 indicates that the four pixels identified in FIG. 2I are ninth-closest to the (2, 2) pixel.

Additional masks (e.g., searchMask9, searchMask10, searchMask11, etc.) may be generated until the generated masks cover (e.g., collectively identify) all sixty-four pixels 204 of the tile 202 (or some other number of pixels that make up the tile 202). For a particular pixel (e.g., the pixel 22 of FIG. 2A), the number of masks that are generated may be denoted as X. The value of X depends on the position of the pixel within the tile 202. For example, X may be as large as 34.

As described earlier, the X masks for a particular pixel (e.g., the (2, 2) pixel illustrated in FIG. 2A) provide an ordering (or categorization) of its neighboring pixels, sorted from nearest to furthest with respect to distance from the particular pixel. For a particular pixel, each of the generated masks may be referred to as a searchMask. All searchMasks generated for the pixel may be included (e.g., in order from nearest pixels to farthest pixels) in the form of a table that is referred to as a searchMaskTable.

As described earlier with reference to the example of FIG. 2A, the tile 202 includes sixty-four pixels 204. SearchMasks are generated for each of the pixels 204, in a manner similar to the manner described with reference to the (2, 2) pixel. Accordingly, sixty-four independent searchMaskTables may be generated. These searchMaskTables may be generated prior to compilation as a preprocessing step or measure (e.g., prior to actual rendering of an image), and stored for use in later processing.

During rendering of an image, pixels (e.g., pixels 204 of tile 202) are sampled, and color information may be computed (or defined) for the sampled pixels. The color information may correspond to a particular color, such as red, green, blue, black, etc. Pixels having color information may be referred to as active pixels, in that each of these pixels has a defined color. According to at least one embodiment, a bitmap is generated to indicate the pixels that are active pixels. This bitmap may be referred to as an activePixelsMask.

The activePixelsMask may be defined using a same bit-to-pixel mapping (or convention) as that described earlier with reference to the searchMasks of FIGS. 2A to 2I. As described earlier with reference to the searchMasks, each bit in the activePixelsMask uniquely corresponds to a respective pixel of the tile. Similar to the searchMasks, the length of the activePixelsMask may be 64 bits.

In the activePixelsMask, a particular bit is set to a specific value (e.g., 1) if the corresponding pixel in the tile is active (e.g., the pixel has color information). Likewise, a particular bit is set to a different value (e.g., 0) if the corresponding pixel in the tile is not active (e.g., the pixel lacks color information). A pixel that is not active may be referred to as an empty pixel.

Figure 3:
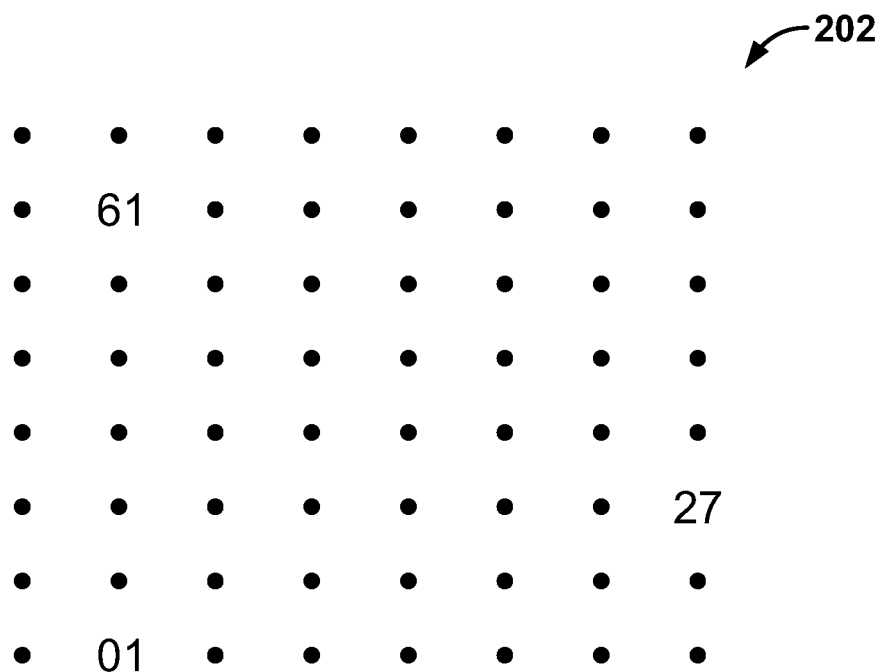
FIG. 3 illustrates examples of pixels referenced by an activePixelsMask that identifies pixels that are active, according to at least one embodiment.

For example, FIG. 3 illustrates an example state of the tile 202 during image rendering. In the illustrated state, color information has been defined for only three pixels: the (1, 0) pixel, the (1, 6) pixel and the (7, 2) pixel. The color information of the three pixels may correspond to a same color or may correspond to different colors. Accordingly, a total of three bits in the activePixelsMask are set to a specific value (e.g., 1). Each of the three bits uniquely corresponds to a respective one of the three active pixels that are identified in FIG. 3. The 61 other bits (the 61 remaining bits) in the activePixelsMask are set to a different value (e.g., 0). By way of example, the activePixelsMask may have a hexadecimal value of 0x0002000000800002.

Empty pixels may be identified using the activePixelsMask. For example, according to the mapping described earlier, a bit in the activePixelsMask that has a value of 0 identifies a corresponding pixel as being empty. As another example, an empty pixel may be identified using the activePixelsMask and the searchMaskTables as will be described in more detail below.

According to at least one embodiment, for each empty pixel that is identified, a nearest active pixel (or at least one of multiple nearest active pixels) is determined by using the searchMaskTables described earlier.

For example, according to the activePixelsMask having a hexadecimal value of 0x0002000000800002 (see FIG. 3), the (2, 2) pixel is identified as an empty pixel. For this particular empty pixel, a bitwise logical AND operation is then performed between the activePixelsMask and a particular searchMask from the searchMaskTable corresponding to this empty pixel. For example, a bitwise logical AND operation is performed between the activePixelsMask and searchMaskx, where the value of x is initially equal to 1.

Alternatively, if a particular pixel (e.g., the (2, 2) pixel) has not yet been identified as an empty pixel or not, then a bitwise logical AND operation is then performed between the activePixelsMask and a first searchMask from the searchMaskTable corresponding to this pixel. For example, a bitwise logical AND operation is performed between the activePixelsMask and searchMaskx, where the value of x is initially equal to 0.

Assuming conventions described earlier, if the bitwise logical AND operation produces a result of 0x0, the value of x is incremented by 1, and another similar bitwise logical AND operation (between the activePixelsMask and searchMaskx) is performed. This may be repeated in an iterative manner until a non-zero value results from performing the bitwise logical AND operation between the activePixelsMask and a particular searchMask.

Under the conventions described earlier, a result not equal to 0x0 indicates the existence of at least one nearest active pixel. If the existence of multiple active pixels is indicated (e.g., the result of the bitwise AND operation includes multiple bits having a particular value (e.g., 1)), then it is determined that multiple pixels are equidistant from the pixel that has been identified as being empty.

For example, with reference to FIG. 3 and back to FIG. 2E, a bitwise logical AND operation between the activePixelsMask and the searchMask4 produces a non-zero value. Here, the (1, 0) pixel is identified as the active pixel that is nearest the (2, 2) pixel.

For purposes of selecting a nearest active pixel (e.g., for further processing), in one example, only a single active pixel that is nearest to the empty pixel is identified. In this situation, the single active pixel is selected as the nearest active pixel. However, in other situations, multiple active pixels may be identified as being nearest to the empty pixel. For example, multiple pixels may be identified as being both active and equidistant from the empty pixel. In this situation, each of the identified active pixels may have an equal probability of being selected as the nearest active pixel. According to a particular embodiment, any one of the identified active pixels may be selected because they are equidistant from the empty pixel (e.g., the (2, 2) pixel). For example, one of the identified active pixels may be randomly selected over the other identified active pixels.

According to at least another embodiment, the pixel that is selected is the active pixel which corresponds to the right-most bit position in the value produced by the bitwise AND operation between the activePixelsMask and the particular searchMask. Therefore, only one active pixel is selected, in response to the identification of multiple active pixels. Selecting the nearest active pixel in this manner may be advantageous because the operation of identifying the right-most bit position, in some situations, may be executed by a special CPU instruction that executes at a relatively fast speed (e.g., via a bsfq instruction (bit scan forward instruction) to count the number of zero-value bits on the right side). Although the selection may be performed in this manner according to at least one embodiment, it is understood that the selection may be performed differently in other embodiments.

As described with reference to various embodiments, a search for a nearest active pixel includes finding an active pixel that is nearest to a particular empty pixel. For example, based on a searchMaskTable, a bitwise AND operation is performed between the activePixelsMask and searchMask0 for a particular empty pixel. Then, subsequent bitwise AND operations are performed between the activePixelsMask and searchMask1, between the activePixelsMask and searchMask2, and so on. The bitwise AND operations are performed (e.g., in an iterative manner) until a result having a non-zero value is obtained. In the manner described, non-empty active pixels may be located, by performing bitwise AND mask operations using precomputed masks of a searchMaskTable.

The performance of the bitwise AND operations may be stopped when a non-0x0 result is produced. This result indicates that at least one nearest active pixel has been located for the empty pixel under consideration. Accordingly, a nearest active pixel for a particular empty pixel may be found by performing bitwise AND operations using the masks (e.g., precomputed masks) of the searchMaskTable.

Figure 4:
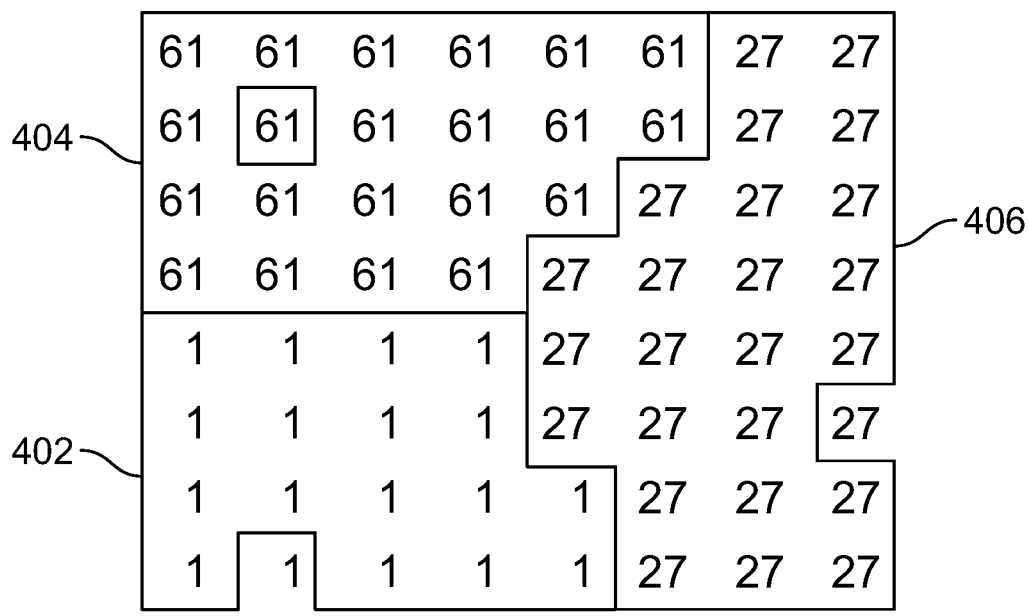
FIG. 4 illustrates an example of a state of a tile in which empty pixels have been filled in according to at least one embodiment, based on the active pixels illustrated in FIG. 3.

FIG. 4 illustrates an example state of the tile 202 during image rendering. In the example of FIG. 4, color information defined for the active pixels identified in FIG. 3 has been used to control display of one or more other pixels (e.g., empty pixels). For pixels in region 402, it was determined that the (1, 0) pixel was the nearest active pixel. As illustrated in FIG. 4, color information defined for the active (1, 0) pixel that was identified in FIG. 3 is used to control display of pixels (e.g., empty pixels) in the region 402. For example, the color defined for the active (1, 0) pixel is used to effectively "fill in" the pixels in the region 402.

For pixels in region 404, it was determined that the (1, 6) pixel was the nearest active pixel. As also illustrated in FIG. 4, color information defined for the active (1, 6) pixel that was identified in FIG. 3 is used to control display of pixels (e.g., empty pixels) in the region 404. For example, the color defined for the active (1, 6) pixel is used to effectively "fill in" the pixels in the region 404.

For pixels in region 406, it was determined that the (7, 2) pixel was the nearest active pixel. As also illustrated in FIG. 4, color information defined for the active (7, 2) pixel that was identified in FIG. 3 is used to control display of pixels (e.g., empty pixels) the region 406. For example, the color defined for the active (7, 2) is used to effectively "fill in" the pixels in the region 406.

Because a display of empty pixels is controlled in such a manner, a user viewing the example tile of FIG. 4 would see sixty-four pixels all having a defined color, rather than a tile including only 3 pixels having a defined color and 61 other pixels not having a defined color. As such, a more visually pleasing and/or aesthetically complete snapshot is presented to the user during rendering of an image (e.g., during an interactive rendering session).

It is understood that a searchMaskTable for a particular pixel may include X searchMasks. The number X depends on the dimensions (e.g., height, width) of the tile in which the pixel is located. For example, for a pixel located in a tile having dimensions of 8 pixels by 8 pixels, the maximum value of X is 34. Accordingly, in such a tile, finding a nearest active pixel for a particular empty pixel may involve execution of a logical bitwise AND operation up to 34 times.

The computational burden (e.g., total number of logical bitwise AND operations that are executed) is increased when the tile has relatively few active pixels (e.g., when an 8×8 tile having 64 pixels has only 1 or 2 pixels that are active). In this situation, the computational burden is increased because, on average, more searchMasks are searched before a nearest active pixel is determined for each of a relatively large number of empty pixels (e.g., 63 or 62 empty pixels in an 8×8 tile).

When the number of active pixels is relatively small, efficiency may be improved. According to at least one further embodiment, the bitwise AND computations are effectively performed in two separate stages. In a first stage, a bitwise AND operation is performed using the activePixelsMask and a bundleMask for a particular empty pixel. If this operation produces a non-0x0 result, then a second stage of computations is begun. In the second stage, bitwise AND operations are performed, as described earlier, using the activePixelsMask and the individual searchMasks corresponding to the bundleMask. Otherwise, if the operation produces a result of zero, then the second stage of computations is not begun. Instead, the first stage of computations continues. For example, a bitwise AND operation is performed using the activePixelsMask and a different bundleMask for the particular empty pixel.

By way of example—with reference back to FIGS. 2A, 2B, 2C and 2D, bundleMask0 may be produced as a result of performing a bitwise OR operation on a total of 4 different masks: searchMask0, searchMask1, searchMask2 and searchMask3. Similarly, with reference back to FIGS. 2E, 2F, 2G and 2H, bundleMask1 may be produced as a result of performing a bitwise OR operation on a total of 4 different masks: searchMask4, searchMask5, searchMask6 and searchMask7. Additional bundleMasks (e.g., bundleMask2, bundleMask3, etc.) may be produced in a similar manner.

Using such bundled masks may reduce the total number of bitwise AND operations are performed. For example, if a bitwise AND operation performed using the activePixelsMask and a particular bundleMask (e.g., bundleMask0) produces a 0x0 result, then performing this single bitwise AND operation effectively reveals the same information that would have been revealed by performing four separate bitwise AND operations—e.g., (1) a bitwise AND operation performed using the activePixelsMask and searchMask0, (2) a bitwise AND operation performed using the activePixelsMask and searchMask1, (3) a bitwise AND operation performed using the activePixelsMask and searchMask2, and (4) a bitwise AND operation performed using the activePixelsMask and searchMask3).

Accordingly, a total number of bitwise AND operations that are required to be performed may be reduced by using bundled masks, e.g., as described in the preceding paragraphs.

Improvement in performance may depend on how many searchMasks are effectively combined into a single bundle-Mask. The level of improvement in performance may also depend on the hardware environment (e.g., CPU generation and cache size) that is employed runtime. According to one or more particular embodiments, bundleMask generation is dynamically executed at runtime, and updated each time a new sample is placed in a tile.

According to one or more particular embodiments, four searchMasks are effectively combined into a bundle, to facilitate a linear search. As noted earlier with reference to a pixel located in a tile having dimensions of 8 pixels by 8 pixels, the maximum number of searchMasks is 34. In situations involving an 8×8 tile—using a linear search based on a bundle of four searchMasks, the maximum computational cost is O(34/4)+ the maximum computational cost of searching based on the individual searchMasks within a bundle (e.g., O(3)). Therefore, the maximum computation cost is O(11.5). The O(3) cost of searching based on individual searchMasks is based on an understanding that computations on a maximum of 3 searchMasks would be performed. For example, if an active pixel is not identified based on operations involving 3 preceding searchMasks, then it can be concluded that the one or more active pixels correspond to the remaining searchMask (the 4th searchMask). The minimum computational cost (i.e., all pixels are rendered) is O(2). Without using bundleMasks, the search for an active pixel is O(X), where X denotes the number of searchMasks and has a maximum value of 34.

According to at least one embodiment, an empty pixel is effectively filled in by identifying a neighboring active pixel that is nearest to the empty pixel, and by using the color information that has been defined for the identified active pixel to fill the empty pixel. The features of identifying a nearest active pixel and using the color information of such an active pixel to fill the empty pixel may be applied, for example, in an initial stage of image rendering, in which sampling results that are provided are relatively sparse. As has been described with reference to various embodiments, bitmasks are employed. By controlling the size of the bitmasks that are used, tiles of various pixel resolutions can be processed in the manners described.

According to at least one embodiment, the filling of empty pixels does not involve interpolating values (e.g., colors) of two or more nearest active pixels. Here, it is recognized that an interpolated color may be a color that does not ultimately appear in an image that has been fully rendered. In such a situation, using an interpolated color may lead the artist may be to judge an intermediate result based on incorrect information. Therefore, according to at least one embodiment, one or more empty pixels in a tile are filled in using color information that has been defined for at least one pixel.

Figure 5:
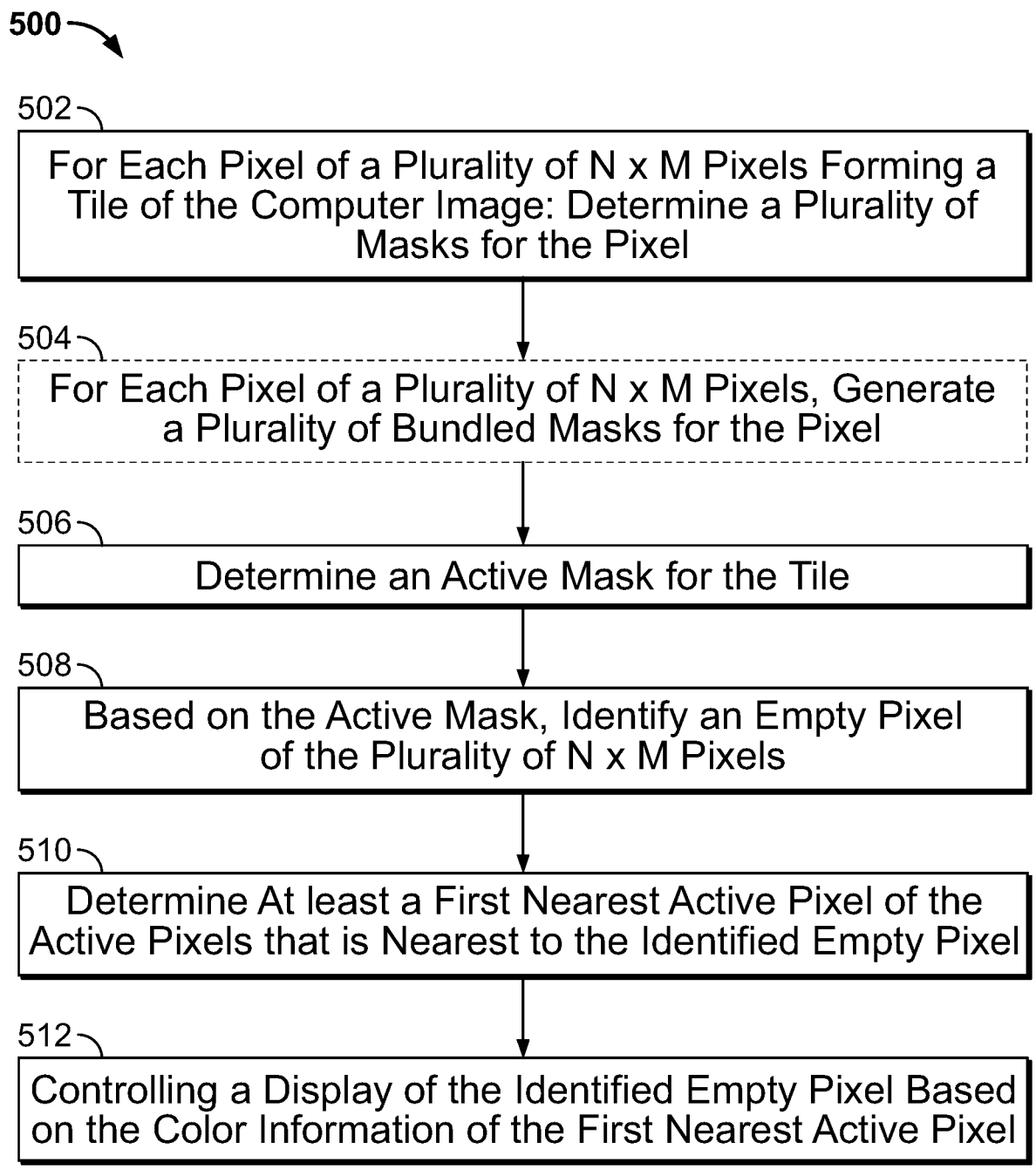
FIG. 5 is a flowchart illustrating a method for rendering a computer image according to at least one embodiment.

FIG. 5 illustrates a flowchart of a method 500 of rendering a computer image according to at least one embodiment.

At block 502—for each pixel of a plurality of N×M pixels forming a tile of the computer image, a plurality of masks for the pixel are determined (or generated). Here, N denotes an integer larger than 1, and M denotes an integer larger than 1. Each of the plurality of masks identifies a respective subset of the plurality of N×M pixels. Each pixel in the subset of pixels is equidistant from the pixel and located at a respective distance from the pixel.

For example, with reference back to FIGS. 2A to 2I, pixels 204 form a tile 202 of a computer image. Masks are determined for the (2, 2) pixel. For example, with reference back to FIG. 2A, searchMask0 indicates that the (2, 2) pixel is closest to the (2, 2) pixel. With reference back to FIG. 2B, searchMask1 indicates that the four pixels identified in FIG. 2B are second-closest to the (2, 2) pixel. The four pixels—the (1, 2) pixel, the (2, 3) pixel, the (3, 2) pixel, and the (2, 1) pixel—are equidistant from the (2, 2) pixel. With reference back to FIG. 2C, searchMask2 indicates that the four pixels identified in FIG. 2C are third-closest to the (2, 2) pixel. The four pixels—the (1, 1) pixel, the (1, 3) pixel, the (3, 3) pixel, and the (3, 1) pixel—are equidistant from the (2, 2) pixel.

According to at least one further embodiment, the plurality of masks for the pixel collectively categorize the plurality of N×M pixels, in order of increasing distance from the pixel. For example, searchMask0, searchMask1, searchMask2, . . . corresponding to FIG. 2A, 2B, 2C . . . collectively categorize the pixels 204, in order of increasing distance from the (2, 2) pixel (e.g., closest, second-closest, third-closest, etc.)

According to at least one further embodiment, N is equal to M.

At block 504, according to at least one further embodiment—for each pixel of the plurality of N×M pixels, a plurality of bundled masks for the pixel are determined (or generated). Each of the plurality of bundled masks identifies a respective bundled subset of the plurality of N×M pixels that are located within a respective range of distances from the pixel.

For example—with reference back to FIGS. 2A, 2B, 2C and 2D, bundleMask0 may be produced as a result of performing a bitwise OR operation on a total of 4 different masks: searchMask0, searchMask1, searchMask2 and searchMask3. As such, bundleMask0 identifies a subset of the pixels 204 that are located within a particular range of distances relative to the (2, 2) pixel.

At block 506, an active mask is determined (or generated) for the tile. The active mask identifies active pixels of the plurality of N×M pixels. Each of the active pixels has been determined as having color information.

For example, with reference back to FIG. 3, the activePixelsMask is determined for the tile 202. A total of three bits in the activePixelsMask are set to a specific value (e.g., 1), to identify three pixels—the (1, 0) pixel, the (1, 6) pixel and the (7, 2) pixel—determined as having color information.

At block 508, based on the active mask, an empty pixel of the plurality of N×M pixels is identified. The empty pixel lacks color information.

For example, based on the activePixelsMask corresponding to FIG. 3, the (2, 2) pixel is identified as an empty pixel.

At block 510, at least a first nearest active pixel is determined. The first nearest active pixel is nearest to the identified empty pixel. The determination of the first nearest active pixel includes comparing the active mask with at least one mask for the identified empty pixel.

According to at least one further embodiment, comparing the active mask with the at least one mask includes performing a bitwise AND operation between the active mask and a first mask of the plurality of masks for the identified empty pixel.

For example, with reference back to FIG. 3 and FIG. 2B, a bitwise AND operation is performed between the activePixelsMask corresponding to FIG. 3 and the searchMask1 corresponding to FIG. 2B.

According to at least one further embodiment, a result of performing the bitwise AND operation between the active mask and the first mask may be equal to zero. In this situation, comparing the active mask with the at least one mask further comprises performing a bitwise AND operation between the active mask and a second mask of the plurality of masks for the identified empty pixel.

For example, with reference back to FIG. 3 and FIG. 2C—if a bitwise AND operation performed between the activePixelsMask corresponding to FIG. 3 and the searchMask1 corresponding to FIG. 2B produces a result of 0, then a bitwise AND operation is performed between the activePixelsMask corresponding to FIG. 3 and the searchMask2 corresponding to FIG. 2C.

According to at least one further embodiment, comparing the active mask with the at least one mask continues until performing a bitwise AND operation between the active mask and a mask of the plurality of masks for the identified empty pixel results in a non-zero value.

For example, with reference back to FIG. 3 and FIG. 2D—if a bitwise AND operation performed between the activePixelsMask corresponding to FIG. 3 and the searchMask2 corresponding to FIG. 2C produces a result of 0, then a bitwise AND operation is performed between the activePixelsMask corresponding to FIG. 3 and the searchMask3 corresponding to FIG. 2D.

With reference back to block 504, a plurality of bundled masks may be determined (or generated). According to at least one further embodiment, comparing the active mask with the at least one mask further comprises performing a bitwise AND operation between the active mask and a first bundled mask of the plurality of bundled masks for the identified empty pixel.

For example, with reference to block 504, bundleMask0 may be produced as a result of performing a bitwise OR operation on a total of 4 different masks: searchMask0, searchMask1, searchMask2 and searchMask3. According to at least one further embodiment, a bitwise AND operation between the activePixelsMask and bundleMask0 may be performed.

At block 512—according to at least one further embodiment, a display of the identified empty pixel is controlled, based on the color information of the first nearest active pixel.

For example, with reference to FIG. 4, a display of identified empty pixels in the region 402 is controlled, based on the color information of the (1, 0) pixel.

Figure 6:
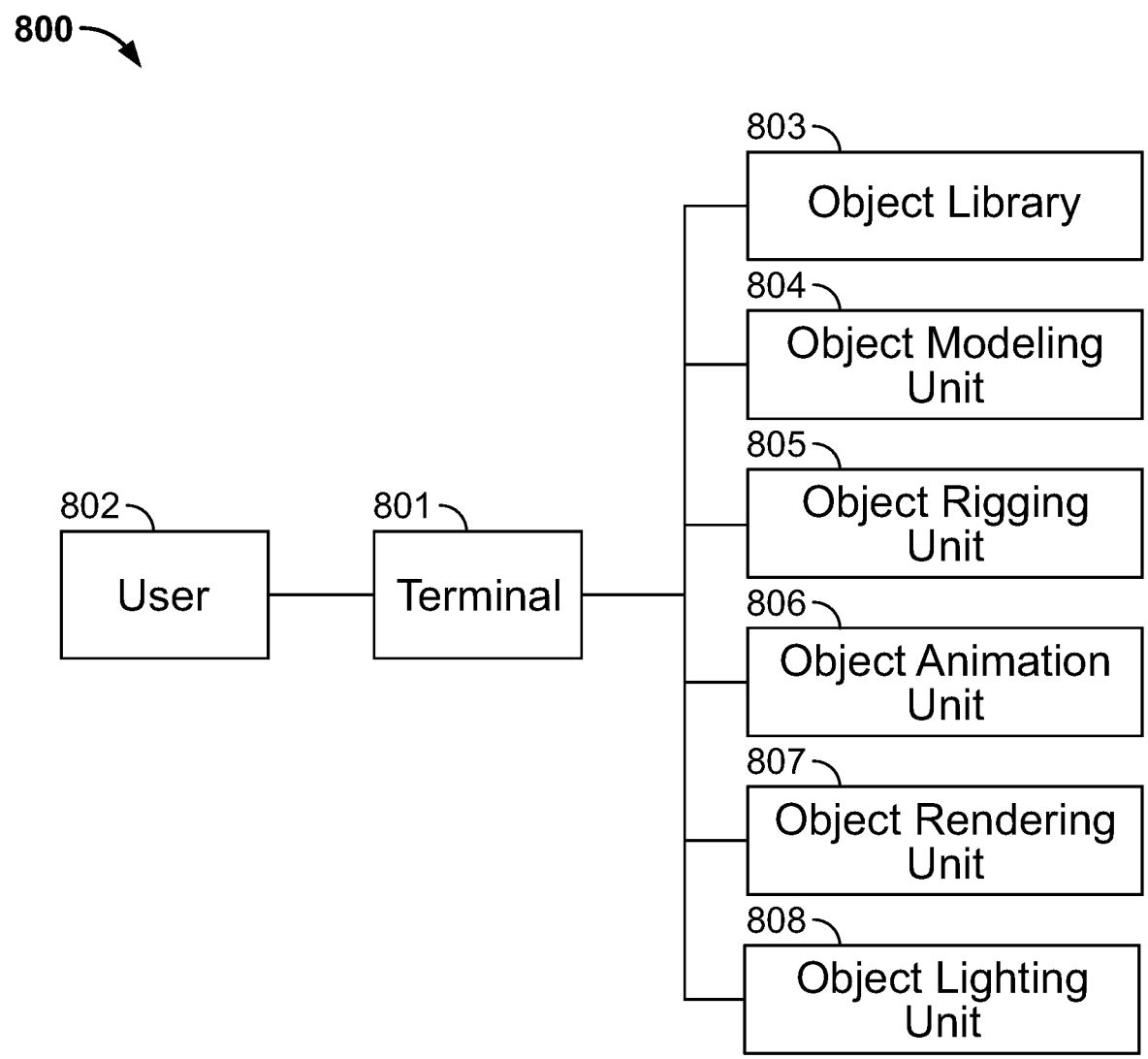
FIG. 6 is an illustration of a computing environment according to at least one embodiment.

Referring now to FIG. 6, a simplified block diagram of a system 800 for creating computer graphics imagery (CGI) and computer-aided animation is shown that may implement or incorporate various embodiments of the present disclosure. The system 800 may include one or more terminals 801. The one or more terminals 801 may include hardware and software elements configured for designing CGI and assisting with computer-aided animation. The terminals 801 may be implemented as a single computing device or a set of one or more computing devices, corresponding to computer hardware and/or software.

Examples of terminals 801 may be desktop computers, laptop computers, workstation computers, mainframes, cluster computing systems, cloud computing terminals, embedded computing devices, computer graphics devices, gaming devices and consoles, video media playback devices, consumer electronic devices having programmable processors, or the like. The one or more terminals 801 may be utilized at various stages of a production process, including pre-production, modeling, designing, creating, editing, simulating, animating, rendering, post-production, finishing, publishing, and the like, to produce recordings, computer files, tangible materials, and the like, related to or comprising images, image sequences, motion pictures, video, audio, or associated effects related to CGI and animation.

In an example of system 800, a user 802 may utilize the one or more terminals 1101 to design, create, or modify objects within a computer-generated interface displayed on display associated with the terminal 801.

The terminal may implement, include, or otherwise be in operable communication with, systems and units including object library 803, object modeling unit 804, object rigging unit 805, object animation unit 806, object rendering unit 807, and object lighting unit 808. Object library 803 may include software and/or hardware elements configured for storing and accessing information related to objects to be accessed, requested, retrieved, and/or used by the one or more terminals 801 to design, create, and modify models (e.g., 3D models) of objects in the CGI and animation processes.

Object modeling unit 804 may include software and/or hardware elements and information to be accessed, requested, retrieved, and/or used by the one or more terminals 801 to sculpt and design the 3D model to take on the desired appearance as instructed by user 802, or other terminal operator during the CGI and animation process.

Object rigging unit 805 may include software and/or hardware elements and information to be accessed, requested, retrieved, and/or used by the one or more terminals 801 to design, create, or modify components of 3D models to define articulation points and movement ranges of various elements of the 3D model.

Object animation unit 806 may include software and/or hardware elements and information to be accessed, requested, retrieved, and/or used by the one or more terminals 801 to design, create, or modify animation aspects of a 3D model, including specifying the motion and position of various elements of the 3D model over time during the animation, such as specifying animation paths, cues, or the like or generating key frames or intermediary frames for animated motion of the 3D model.

Object rendering unit 807 may include software and/or hardware elements and information to be accessed, requested, retrieved, and/or used by the one or more terminals 801 to design, create, or modify a final appearance of the animated 3D model, including generating one or more images of one or more computer-generated objects, including textures, colors, rigging, controls, and the like.

Object lighting unit 808 may include software and/or hardware elements and information to be accessed, requested, retrieved, and/or used by the one or more terminals 801 to design, create, or modify lighting aspects of a 3D model and animated scenes, including defining lighting sources, shading, reflections, refractions, textures, colors, and the like.

The one or more terminals 801 may be in communication with one or more server computers which may operatively be in communication with one or more data stores (e.g., databases, indexes, files, or other data structures). The one or more server computers may connect to a data communication network comprising a local area network (LAN), a wide area network (WAN) (e.g., the Internet), a telephone network, a satellite or wireless communication network, or some combination of these or similar networks.

In selected embodiments, the one or more server computers may implement one or more processes, systems, or units of the animation system, including object library 803, object modeling unit 804, object rigging unit 805, object animation unit 806, object rendering unit 807, object lighting unit 808, and the like. The one or more terminals 801, the one or more server computers, or any other aspect of the system 800, may be associated or coupled with a display configured to display information, including a displayed interface for displaying, performing, executing, instructing, reviewing, and/or selecting operations of the present disclosure.

Figure 7:
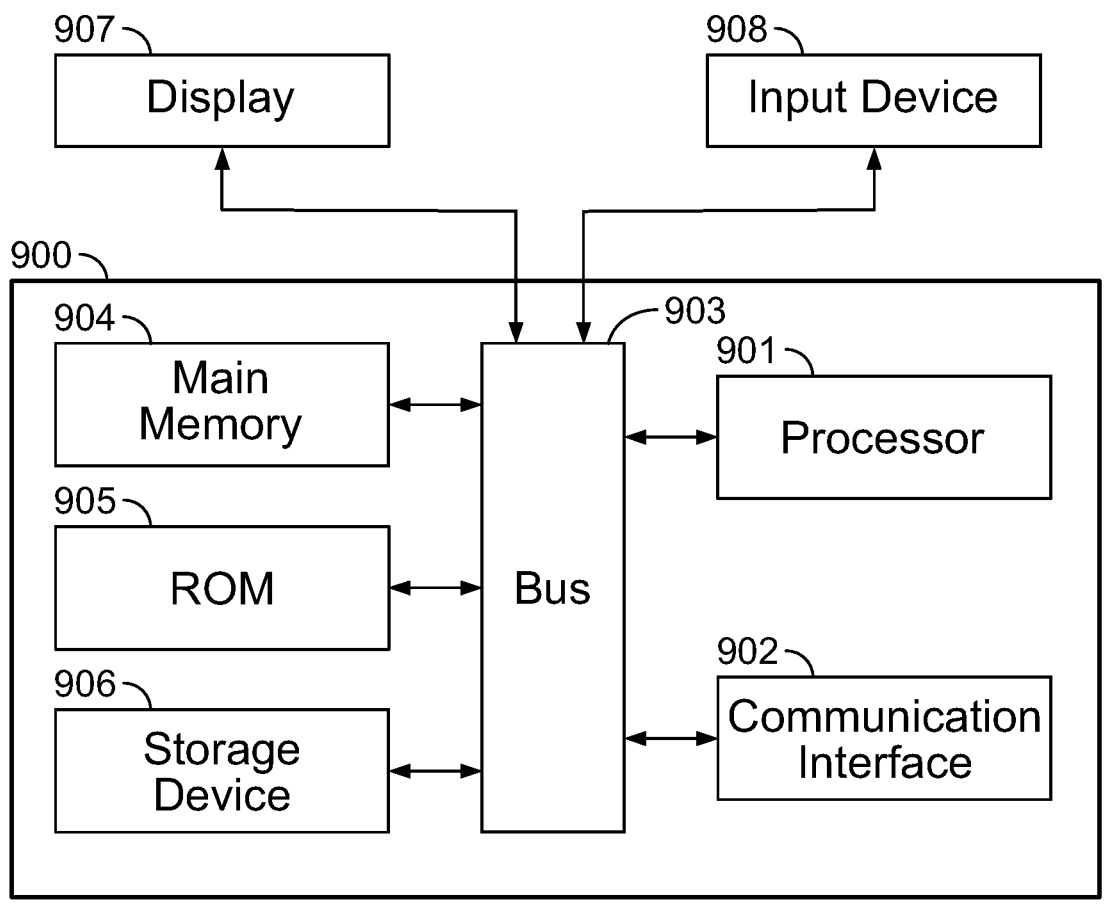
FIG. 7 is a block diagram of a device according to at least one embodiment.

Referring to FIG. 7, an illustration of an example computer 900 is provided. One or more of aspects of the system 800 discussed above in FIG. 6, such as the one or more terminals 801 or the one or more server computers, may be configured as or include such a computer 900. In selected embodiments, the computer 900 may include a bus 903 (or multiple buses) or other communication mechanism, a processor 901, main memory 904, read only memory (ROM) 905, one or more additional storage devices 906, and/or a communication interface 902, or the like or sub-combinations thereof. The embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In all embodiments, the various components described herein may be implemented as a single component, or alternatively may be implemented in various separate components.

A bus 903 or other communication mechanism, including multiple such buses or mechanisms, may support communication of information within the computer 900. The processor 901 may be connected to the bus 903 and process information. In selected embodiments, the processor 901 may be a specialized or dedicated microprocessor configured to perform particular tasks in accordance with the features and aspects disclosed herein by executing machine-readable software code defining the particular tasks. Main memory 904 (e.g., random access memory—or RAM—or other dynamic storage device) may be connected to the bus 903 and store information and instructions to be executed by the processor 901. Main memory 904 may also store temporary variables or other intermediate information during execution of such instructions.

ROM 905 or some other static storage device may be connected to a bus 903 and store static information and instructions for the processor 901. An additional storage device 906 (e.g., a magnetic disk, optical disk, memory card, or the like) may be connected to the bus 903. The main memory 904, ROM 905, and the additional storage device 906 may include a non-transitory computer-readable medium holding information, instructions, or some combination thereof, for example instructions that when executed by the processor 901, cause the computer 900 to perform one or more operations of a method as described herein. A communication interface 902 may also be connected to the bus 903. A communication interface 902 may provide or support two-way data communication between a computer 900 and one or more external devices (e.g., other devices contained within the computing environment).

In selected embodiments, the computer 900 may be connected (e.g., via a bus) to a display 907. The display 907 may use any suitable mechanism to communicate information to a user of a computer 900. For example, the display 907 may include or utilize a liquid crystal display (LCD), light emitting diode (LED) display, projector, or other display device to present information to a user of the computer 900 in a visual display. One or more input devices 908 (e.g., an alphanumeric keyboard, mouse, microphone, stylus pen) may be connected to the bus 903 to communicate information and commands to the computer 900. In selected embodiments, one input device 908 may provide or support control over the positioning of a cursor to allow for selection and execution of various objects, files, programs, and the like provided by the computer 900 and displayed by the display 907.

The computer 900 may be used to transmit, receive, decode, display, or the like one or more video files. In selected embodiments, such transmitting, receiving, decoding, and displaying may be in response to the processor 901 executing one or more sequences of one or more instructions contained in main memory 904. Such instructions may be read into main memory 904 from another non-transitory computer-readable medium (e.g., a storage device).

Execution of sequences of instructions contained in main memory 904 may cause the processor 901 to perform one or more of the procedures or steps described herein. In selected embodiments, one or more processors in a multi-processing arrangement may also be employed to execute sequences of instructions contained in main memory 904. Alternatively, or in addition thereto, firmware may be used in place of, or in connection with, software instructions to implement procedures or steps in accordance with the features and aspects disclosed herein. Thus, embodiments in accordance with the features and aspects disclosed herein may not be limited to any specific combination of hardware circuitry and software.

Non-transitory computer readable medium may refer to any medium that participates in holding instructions for execution by the processor 901, or that stores data for processing by a computer, and comprise all computer-readable media, with the sole exception being a transitory, propagating signal. Such a non-transitory computer readable medium may include, but is not limited to, non-volatile media, volatile media, and temporary storage media (e.g., cache memory). Non-volatile media may include optical or magnetic disks, such as an additional storage device. Volatile media may include dynamic memory, such as main memory. Common forms of non-transitory computer-readable media may include, for example, a hard disk, a floppy disk, magnetic tape, or any other magnetic medium, a CD-ROM, DVD, Blu-ray or other optical medium, RAM, PROM, EPROM, FLASH-EPROM, any other memory card, chip, or cartridge, or any other memory medium from which a computer can read.

In selected embodiments, a communication interface 902 may provide or support external, two-way data communication to or via a network link. For example, a communication interface 902 may be a wireless network interface controller or a cellular radio providing a data communication network connection. Alternatively, a communication interface 902 may comprise a local area network (LAN) card providing a data communication connection to a compatible LAN. In any such embodiment, a communication interface 902 may send and receive electrical, electromagnetic, or optical signals conveying information.

A network link may provide data communication through one or more networks to other data devices (e.g., one or more terminals 801 as shown in the system 800). For example, a network link may provide a connection through a local network of a host computer or to data equipment operated by an Internet Service Provider (ISP). An ISP may, in turn, provide data communication services through the Internet. Accordingly, a computer 900 may send and receive commands, data, or combinations thereof, including program code, through one or more networks, a network link, and communication interface 902. Thus, the computer 900 may interface or otherwise communicate with a remote server, or some combination thereof.

The various devices, modules, terminals, and the like discussed herein may be implemented on a computer by execution of software comprising machine instructions read from computer-readable medium, as discussed above. In certain embodiments, several hardware aspects may be implemented using a single computer, in other embodiments multiple computers, input/output systems and hardware may be used to implement the system.

For a software implementation, certain embodiments described herein may be implemented with separate software modules, such as procedures and functions, each of which perform one or more of the functions and operations described herein. The software codes can be implemented with a software application written in any suitable programming language and may be stored in memory and executed by a controller or processor.

The foregoing disclosed embodiments and features are merely exemplary and are not to be construed as limiting the present invention. The present teachings can be readily applied to other types of apparatuses and processes. The description of such embodiments is intended to be illustrative, and not to limit the scope of the claims. Many alternatives, modifications, and variations will be apparent to those skilled in the art.

What is claimed is:

1. A method of rendering a computer image, the method comprising:
   determining an active pixel subset for a tile formed by a plurality of pixels, the active pixel subset comprising active pixels having computed color information;
   identifying an empty pixel of the plurality of pixels, the empty pixel lacking computed color information; and
   determining at least a first nearest active pixel of the active pixels that is nearest to the identified empty pixel by comparing the active pixel subset with at least a first pixel subset of a plurality of pixel subsets for the identified empty pixel,
   wherein each of the plurality of pixel subsets for the identified empty pixel comprises a respective subset of the plurality of pixels that are equidistant from the identified empty pixel and located at a respective distance from the identified empty pixel.

2. The method of claim 1, wherein:
   comparing the active pixel subset with at least the first pixel subset comprises comparing an active pixel identifier against at least a first pixel subset identifier;
   the active pixel identifier corresponds to the active pixel subset and identifies the active pixels of the plurality of pixels; and
   the first pixel subset identifier corresponds to the first pixel subset and identifies pixels of the first pixel subset.

3. The method of claim 1, wherein:
   comparing the active pixel subset with at least the first pixel subset comprises comparing the active pixel subset with both the first pixel subset and at least a second pixel subset of the plurality of pixel subsets for the identified empty pixel,
   wherein the first pixel subset and the second pixel subset collectively comprise a bundled subset of the plurality of pixels that are located within a range of distances from the identified empty pixel.

4. The method of claim 3, wherein:
   comparing the active pixel subset with both the first pixel subset and at least the second pixel subset comprises comparing an active pixel identifier against a pixel subset identifier;
   the active pixel identifier corresponds to the active pixel subset and identifies the active pixels of the plurality of pixels; and
   the pixel subset identifier corresponds to both the first pixel subset and the second pixel subset, and identifies both pixels of the first pixel subset and pixels of the second pixel subset.

5. The method of claim 1, further comprising:
   for each pixel of the plurality of pixels, determining a plurality of pixel subsets for the pixel, each of the plurality of pixel subsets for the pixel comprising a respective subset of the plurality of pixels that are equidistant from the pixel and located at a respective distance from the pixel.

6. The method of claim 5, wherein, for each pixel of the plurality of pixels, the plurality of pixel subsets for the pixel collectively categorize the plurality of pixels, in order of increasing distance from the pixel.

7. The method of claim 5, wherein, for a particular pixel of the plurality of pixels, pixels that are in a particular pixel subset of the plurality of pixel subsets for the particular pixel have pixel centers that are located at the respective distance from a center of the particular pixel.

8. The method of claim 1, wherein:
   the plurality of pixels comprises N×M pixels;
   N denotes an integer larger than 1; and
   M denotes an integer larger than 1.

9. The method of claim 8, wherein N is equal to M.

10. The method of claim 1, further comprising:
    controlling a display of the identified empty pixel based on the computed color information of the first nearest active pixel.

11. A machine-readable non-transitory medium having stored thereon machine-executable instructions for rendering a computer image, the instructions comprising:
    determining an active pixel subset for a tile formed by a plurality of pixels, the active pixel subset comprising active pixels having computed color information;
    identifying an empty pixel of the plurality of pixels, the empty pixel lacking computed color information; and
    determining at least a first nearest active pixel of the active pixels that is nearest to the identified empty pixel by comparing the active pixel subset with at least a first pixel subset of a plurality of pixel subsets for the identified empty pixel,
    wherein each of the plurality of pixel subsets for the identified empty pixel comprises a respective subset of the plurality of pixels that are equidistant from the identified empty pixel and located at a respective distance from the identified empty pixel.

12. The machine-readable non-transitory medium of claim 11, wherein:
    comparing the active pixel subset with at least the first pixel subset comprises comparing an active pixel identifier against at least a first pixel subset identifier;
    the active pixel identifier corresponds to the active pixel subset and identifies the active pixels of the plurality of pixels; and
    the first pixel subset identifier corresponds to the first pixel subset and identifies pixels of the first pixel subset.

13. The machine-readable non-transitory medium of claim 11, wherein:
    comparing the active pixel subset with at least the first pixel subset comprises comparing the active pixel subset with both the first pixel subset and at least a second pixel subset of the plurality of pixel subsets for the identified empty pixel, wherein the first pixel subset and the second pixel subset collectively comprise a bundled subset of the plurality of pixels that are located within a range of distances from the identified empty pixel.

14. The machine-readable non-transitory medium of claim 13, wherein:

comparing the active pixel subset with both the first pixel subset and at least the second pixel subset comprises comparing an active pixel identifier against a pixel subset identifier;

the active pixel identifier corresponds to the active pixel subset and identifies the active pixels of the plurality of pixels; and the pixel subset identifier corresponds to both the first pixel subset and the second pixel subset, and identifies both pixels of the first pixel subset and pixels of the second pixel subset.

15. The machine-readable non-transitory medium of claim 11, wherein the instructions further comprise:

for each pixel of the plurality of pixels, determining a plurality of pixel subsets for the pixel, each of the plurality of pixel subsets for the pixel comprising a respective subset of the plurality of pixels that are equidistant from the pixel and located at a respective distance from the pixel.

16. The machine-readable non-transitory medium of claim 15, wherein, for each pixel of the plurality of pixels, the plurality of pixel subsets for the pixel collectively categorize the plurality of pixels, in order of increasing distance from the pixel.

17. The machine-readable non-transitory medium of claim 15, wherein, for a particular pixel of the plurality of pixels, pixels that are in a particular pixel subset of the plurality of pixel subsets for the particular pixel have pixel centers that are located at the respective distance from a center of the particular pixel.

18. The machine-readable non-transitory medium of claim 11, wherein:

the plurality of pixels comprises N×M pixels;

N denotes an integer larger than 1; and

M denotes an integer larger than 1.

19. The machine-readable non-transitory medium of claim 11, wherein the instructions further comprise:

controlling a display of the identified empty pixel based on the computed color information of the first nearest active pixel.

20. A system for rendering a computer image, the system comprising one or more controllers configured to:

determine an active pixel subset for a tile formed by a plurality of pixels, the active pixel subset comprising active pixels having computed color information;

identify an empty pixel of the plurality of pixels, the empty pixel lacking computed color information; and determine at least a first nearest active pixel of the active pixels that is nearest to the identified empty pixel by comparing the active pixel subset with at least a first pixel subset of a plurality of pixel subsets for the identified empty pixel, wherein each of the plurality of pixel subsets for the identified empty pixel comprises a respective subset of the plurality of pixels that are equidistant from the identified empty pixel and located at a respective distance from the identified empty pixel.

21. A method of rendering a computer image, the method comprising:

determining an active pixel subset for a tile formed by a plurality of pixels, the active pixel subset comprising active pixels having color information;

identifying an empty pixel of the plurality of pixels, the empty pixel lacking color information; and determining at least a first nearest active pixel of the active pixels that is nearest to the identified empty pixel by comparing the active pixel subset with at least a first pixel subset of a plurality of pixel subsets for the identified empty pixel, wherein:

each of the plurality of pixel subsets for the identified empty pixel comprises a respective subset of the plurality of pixels that are equidistant from the identified empty pixel and located at a respective distance from the identified empty pixel;

comparing the active pixel subset with at least the first pixel subset comprises comparing the active pixel subset with both the first pixel subset and at least a second pixel subset of the plurality of pixel subsets for the identified empty pixel, wherein the first pixel subset and the second pixel subset collectively comprise a bundled subset of the plurality of pixels that are located within a range of distances from the identified empty pixel;

comparing the active pixel subset with both the first pixel subset and at least the second pixel subset comprises comparing an active pixel identifier against a pixel subset identifier;

the active pixel identifier corresponds to the active pixel subset and identifies the active pixels of the plurality of pixels; and the pixel subset identifier corresponds to both the first pixel subset and the second pixel subset, and identifies both pixels of the first pixel subset and pixels of the second pixel subset.

* * * * *